(12) United States Patent
Helstern

(10) Patent No.: US 8,702,249 B2
(45) Date of Patent: Apr. 22, 2014

(54) OPTICAL DISPLAY WITH OPTICAL MONOLITH

(75) Inventor: Robert P. Helstern, Irvine, CA (US)

(73) Assignee: Staco Systems Corporation, Irvine, CA (US)

( * ) Notice: Subject to any disclaimer, the term of this patent is extended or adjusted under 35 U.S.C. 154(b) by 482 days.

(21) Appl. No.: 12/839,312

(22) Filed: Jul. 19, 2010

(65) Prior Publication Data

US 2012/0013986 A1    Jan. 19, 2012

(51) Int. Cl.
*G02B 27/00*    (2006.01)
*G09F 13/04*    (2006.01)
*F21V 9/10*    (2006.01)
*G02B 5/02*    (2006.01)

(52) U.S. Cl.
CPC .............. *G02B 5/0242* (2013.01); *G09F 13/04* (2013.01); *F21V 9/10* (2013.01); *G02B 5/02* (2013.01)
USPC .............. 359/614; 359/599; 40/564; 362/293

(58) Field of Classification Search
USPC .................... 359/601–614, 896, 599
See application file for complete search history.

(56) References Cited

U.S. PATENT DOCUMENTS

| | | | |
|---|---|---|---|
| 4,069,186 A | 1/1978 | Ramig | |
| 4,729,068 A * | 3/1988 | Ohe | 362/615 |
| 5,295,050 A | 3/1994 | Helstern et al. | |
| 5,544,019 A | 8/1996 | Tatavoosian et al. | |
| 5,743,629 A | 4/1998 | Helstern et al. | |
| 5,820,246 A | 10/1998 | Helstern | |
| 5,913,617 A | 6/1999 | Helstern | |
| 5,951,150 A | 9/1999 | Helstern | |
| 7,312,434 B1 | 12/2007 | Helstern | |
| 7,338,184 B2 * | 3/2008 | Chen et al. | 362/246 |
| 2006/0027141 A1 | 2/2006 | Tarng et al. | |
| 2008/0073624 A1 * | 3/2008 | Choi et al. | 252/582 |
| 2009/0087556 A1 | 4/2009 | Bashir et al. | |

* cited by examiner

*Primary Examiner* — Thong Nguyen
(74) *Attorney, Agent, or Firm* — Paul D. Chancellor; Ocean Law

(57) ABSTRACT

An optical device includes an optical monolith having inclusions for diffusing light.

2 Claims, 6 Drawing Sheets

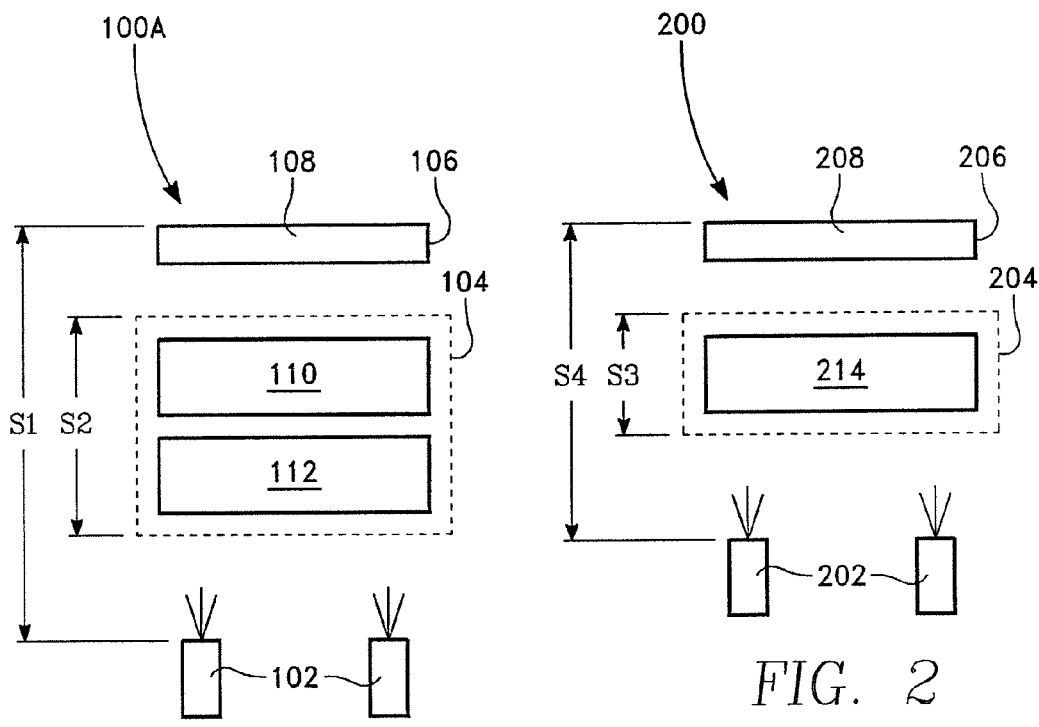
FIG. 1A (Prior Art)
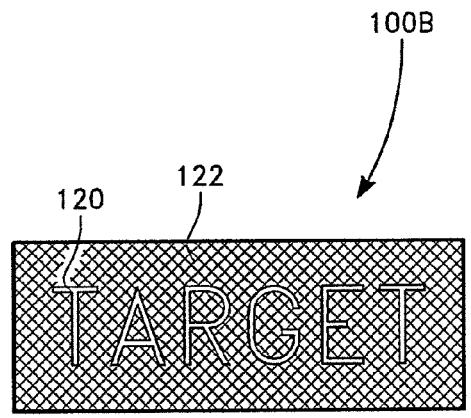
FIG. 2
FIG. 1B (Prior Art)

OPTICAL DISPLAY WITH OPTICAL MONOLITH

BACKGROUND OF THE INVENTION

1. Field of the Invention

The present invention relates to optical devices. In particular, display optics alter the characteristics of light passing therethrough for the purpose of illuminating a display.

2. Discussion of the Related Art

Illuminated visual displays are ubiquitous. They are found in old devices such as candle boxes with sidewall cutouts and in modern devices such as electrically lighted signage. These devices are adapted to convey a message to a viewer, usually via a brightly lit message that appears amid relatively dark surroundings.

Although illuminated displays are commonplace, new applications frequently demand technological advancements including, for example, improved light sources, optics and packaging. Advancements in displays for use in bright sunlight are one example. Other less well known examples include advanced low profile displays and displays for use in concert with night vision equipment.

SUMMARY OF THE INVENTION

An optical display utilizes an optical monolith having inclusions. In an embodiment, an optical device is for enhancing the diffusion of light and comprises: a monolith including an optical plastic; the monolith operable to transmit light incident on one monolith surface to and through a second monolith surface, a monolith thickness being defined by a spacing between the first and second monolith surfaces; polymeric inclusions distributed throughout the optical plastic for interrupting light rays refracted by the monolith; and, the polymeric inclusions selected to simultaneously a) absorb a particular portion of the visible spectrum of the incident light and b) diffuse refracted rays of the incident light.

In an embodiment, the above device wherein the optical plastic, inclusions and thickness are chosen provide a light transmissivity from about 22.5 percent to about 30 percent over a range of wavelengths from about 430 nanometers to at least about 780 nanometers.

In an embodiment, the above device wherein the inclusions are polystyrene particles having an average particle diameter from about 0.2 microns to about 20.0 microns. And, in an embodiment, the above device wherein the inclusions are titanium dioxide particles having an average diameter from about 0.2 microns to about 20 microns.

In an embodiment, the above device includes a capsule housing having a substantially open end and a substantially closed end; an indicia layer supported by the capsule open end and one or more collimated light sources supported by the capsule closed end; the monolith being located between the light sources and the indicia layer; a switch housing having a substantially open end and a substantially closed end; the optical display capsule protruding from the switch housing open end and an electromechanical switch supported by the switch housing closed end; a push rod fixed at one end to the optical display capsule and at the other end to the electromechanical switch; and, the switch operable in response to relative motion between the optical display capsule and the switch housing.

In some embodiments, the optical plastic and inclusions of the above device are liquids such an optical plastic liquid of an acrylic monomer and an optical inclusion liquid of a styrene dissolved in an acrylic monomer. And, in some embodiments, a homogenous solution of the optical plastic and inclusion liquids is enclosed in a pliable, transparent container.

In an embodiment, the above device includes one or more collimated light sources and an indicia layer; wherein the pliable transparent container is located between the light sources and the indicia layer; and, the pliable transparent container is operable to deform and seal against an adjacent part.

In an embodiment, the above device includes a capsule housing having a substantially open end and a substantially closed end; the indicia layer supported by the capsule open end and the one or more collimated light sources supported by the capsule closed end; the pliable transparent container operable to deform and seal against an adjacent part; a switch housing having a substantially open end and a substantially closed end; the optical display capsule protruding from the switch housing open end and an electromechanical switch supported by the switch housing closed end; a push rod fixed at one end to the optical display capsule and at the other end to the electromechanical switch; and, the switch operable in response to relative motion between the optical display capsule and the switch housing.

In some embodiments, the above device wherein the monolith includes optical plastic and polymeric inclusions formed by blending polymers. And, in some embodiments a first blended polymer is a polycarbonate based optical material. And in some embodiments a second blended polymer is a silicon co-polymer based inclusion material. And in some embodiments wherein the optical plastic is a flowable material.

In an embodiment, a method of making an optical device to diffuse light in accordance with the present invention comprises the steps of: specifying the performance of an optical monolith by selecting the monolith's attenuation of selected wavelengths of light; selecting a monomer suited for making a plastic from the group consisting of polymethylmethacrylate, polystyrene, polycarbonate, acrylic styrene methyl methacrylate copolymer, polyolefin, arton, Optores OZ 1000-1100, and Optores OZ 1310-1330; selecting an inclusion for distributing in the monomer, the inclusion's light absorbing and light reflecting properties being selected in accordance with the specified monolith performance and a monolith thickness; mixing the monomer and the inclusion; filtering the mixture to control a dimension of the inclusions; adding a hardener for polymerizing the monomer to the mixture; and, filling a mold with the mixture for casting the optical monolith.

And, in an embodiment, a method of improving light distribution in a reduced profile display in accordance with the present invention comprises the steps of: fabricating an optical monolith by dispersing inclusions in an optical plastic; locating the monolithic between one or more light emitting diode light sources and an indicia layer; the monolith absorbing a portion of the light incident on the monolith; and, the monolith diffusing a refracted ray of the light source incident on the monolith.

BRIEF DESCRIPTION OF THE DRAWINGS

The present invention is described with reference to the accompanying figures. These figures, incorporated herein and forming part of the specification, illustrate embodiments of the invention and, together with the description, further serve to explain its principles enabling a person skilled in the relevant art to make and use the invention.

FIG. 1A shows a prior art optical display.

FIG. 1B shows a prior art indicia layer.

FIG. 2 shows an optical display with an optical monolith in accordance with the present invention.

DETAILED DESCRIPTION OF PREFERRED EMBODIMENTS

Figure 3:
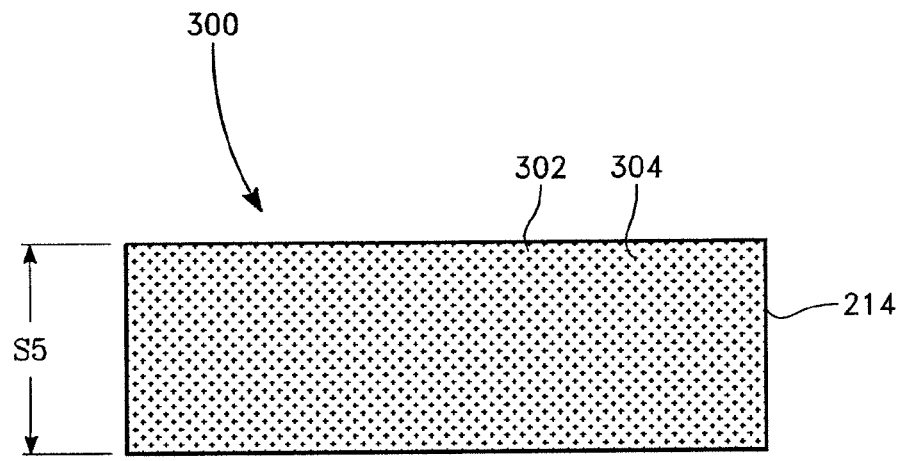
FIG. 3 shows a cross-sectional view of the optical monolith of FIG. 2.

The disclosure provided in the following pages describes examples of some embodiments of the invention. The designs, figures and description are non-limiting examples of the embodiments they disclose. For example, other embodiments of the disclosed device and/or method may or may not include the features described herein. Moreover, disclosed advantages and benefits may apply to only certain embodiments of the invention and should not be used to limit the disclosed invention.

As used herein, the term "coupled" includes direct and indirect connections. Moreover, where first and second devices are coupled, intervening devices including active devices may be located therebetween.

FIG. 1A shows a prior art optical display 100A. Light emitted from one or more point light sources 102 illuminates an indicia layer 106 after passing through an intermediate optics section 104 such as optics for filtering light 110 and optics for diffusing light 112. A focal length dimension S1 measures the distance between the light center line ("LCL") and an observable surface of the indicia layer 108. As can be seen, the focal length is determined in large part by the thickness S2 of the prior art intermediate optics section.

FIG. 1B shows a top view of a typical prior art indicia layer 100B. Here, the indicia layer provides a display by locating symbols 120 with a first light transmission characteristic within surroundings 122 having a second and different light transmission characteristic. For example, symbols such as alphabetic characters making up the word "TARGET" might pass more light than the surrounding area and thus stand out as lit or brightly lit by comparison.

FIG. 2 shows an optical display in accordance with the present invention 200. Light emitted from one or more point light sources 202 illuminates an indicia layer 206 after passing through an intermediate optics section 204. The intermediate optics section incorporates an optical monolith 214. In various embodiments, the monolith is oriented optically perpendicular to the light source.

A focal length dimension S4 measures the distance between the light center line and an observable surface of the indicia layer 208. The focal length is in large part determined by the thickness S3 of the intermediate optics section, and in some embodiments, a reduced intermediate optics section thickness provides a shorter focal length.

Notably, many optical displays 200 rely on the intermediate optics section to diffuse the light from a highly directional light source such as a light emitting diode ("LED") with collimated light rays. As used here, collimated light refers to light whose rays are nearly parallel and therefore spread slowly as the light propagates.

FIG. 3 shows a cross-sectional view of an optical monolith in accordance with the present invention 300. Inclusions 304 distributed within a matrix 302 form an optical monolith 214 having a thickness "S5." In various embodiments, the optical monolith disperses and/or filters light.

The optical monolith 214 of the present invention can be adapted to disperse and/or filter light according to a wide range of specifications. For example, the optical monolith can be adapted to meet a particular transmissivity specification such as the transmissivity specification 400 illustrated by the graph of FIG. 4.

The transmissivity specification 400 defines upper and lower bounds for light transmission over a range of wavelengths. The upper bound 402 is about 30%, the lower bound 404 about 22.5%, and the range of transmitted wavelengths is from about 430 nanometers (nm) to a wavelength in excess of 780 nm. Notably, the visible spectrum extends between about 390 and 750 nm and, as can be seen, this specification blocks the ultra violet ("UVA") portion of the spectrum below about 390 nm.

The optical monolith's constituent materials, constituent material proportions and thickness S5 can be varied to change the monolith's light diffusing and light filtering properties. In various embodiments, the materials forming the matrix 302 and inclusions 304 are chosen from Table 1 below.

TABLE 1

| Matrix Material | Inclusion Material/State |
|---|---|
| Monomers suitable for polymerization into optical plastics | Titanium dioxide |
| Acrylic monomers including methylmethacrylate | Polystyrene |
| Monomers of silicon co-polymers | |
| Monomers of polycarbonate including diphenyl carbonate | |

For a given matrix material and thickness S5, increasing the proportion of the inclusion material(s) in the mixture tends to increase light dispersion and decrease light transmission. At a sufficiently large inclusion density (inclusion volume divided by total volume), passage of light is substantially blocked. And, for a given matrix and inclusion material, increasing the average diameter of the inclusion particles tends to increase light transmission and to decrease light dispersion.

The above specification 400 was achieved by mixing a single monomer with a single inclusion material to form an optical monolith with a 1.75 mm thickness. Table 2 below provides exemplary optical monolith constituents and inclusion density ranges.

TABLE 2

| | | Material Characteristic(s) |
|---|---|---|
| Matrix Material | methylmethacrylate (MMA) | Liquid |
| Inclusion Material | polystyrene | Solid, 2 micron |
| Inclusion Density Ranges | 0.01-1.0% and 0.1-0.2% | |
| Hardener | suitable hardener such as Methylene-Bis(chloro-diethyl-aniline) MCDEA | |

Structural properties of the optical monolith vary with the strength of the plastic and relative and absolute dimensions of the monolith. The hardness of the monolith can be varied by using less hardener than is required for complete polymerization. For example, monoliths of PMMA and Polystyrene with polymerizations of less than 90% have been found to be suitable for post polymerization shaping operations such as machining, polishing and grinding. In particular, a properly sized monolith with polymerization of about 87% has been found to be sufficiently stiff and tough for post polymerization machining, polishing and grinding.

While the example of Table 1 mixes liquid methylmethacrylate monomer with solid polystyrene inclusions and a hardener, the optical monolith need not be a solid. Indeed, optical monoliths can be fluid in nature. For example, a liquid monomer and a liquid inclusion can be mixed to form an optical monolith that is a homogeneous solution of the two liquids. An example of liquid constituents forming a fluid optical monolith is presented in Table 3 below.

TABLE 3

|  |  | Material Characteristic(s) |
|---|---|---|
| Matrix Material | acrylic monomer methylmethacrylate (MMA) | Liquid |
| Inclusion Material | titanium Dioxide dissolved in acrylic monomer styrene dissolved in acrylic monomer | Liquid |
| Inclusion Density Ranges | 0.01-1.0% and 0.1-0.2% |  |

Figure 5:
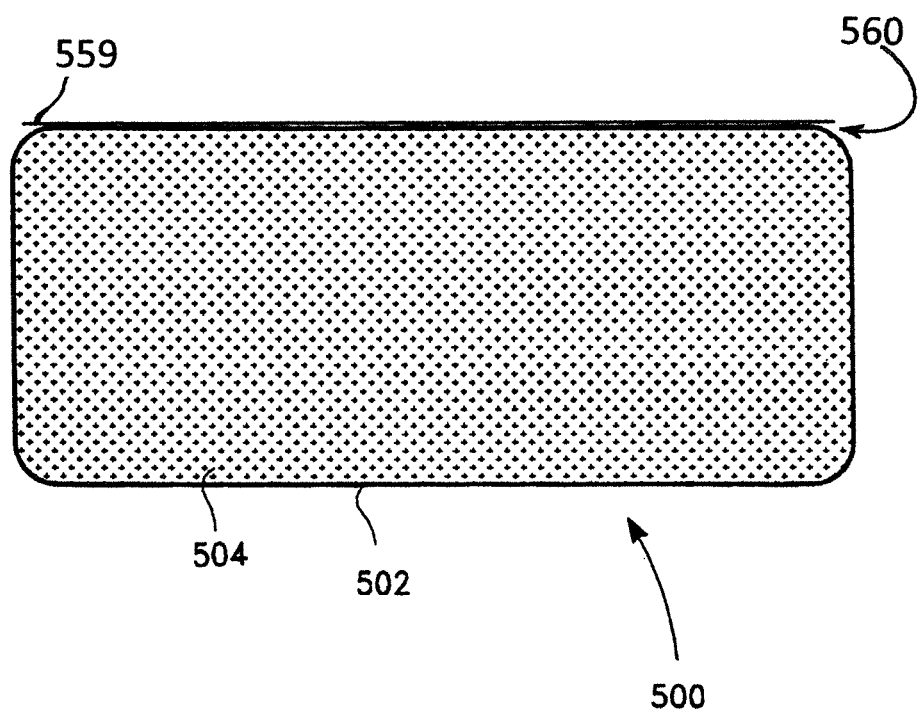
FIG. 5 shows a fluid embodiment of the optical monolith of FIG. 2.

FIG. 5 shows an embodiment of a fluid optical monolith 500. Here, a pliable transparent or translucent container such as a container made from mylar, polyester, acetate, vinyl or polycarbonate 502 envelops a homogeneous mixture 504 including a liquid matrix material and a liquid inclusion material. See also adjacent part 559 sealing 560 against the pliable transparent container 502. As will be further described below, solid and liquid monoliths find various applications in optical displays.

Figure 6A:
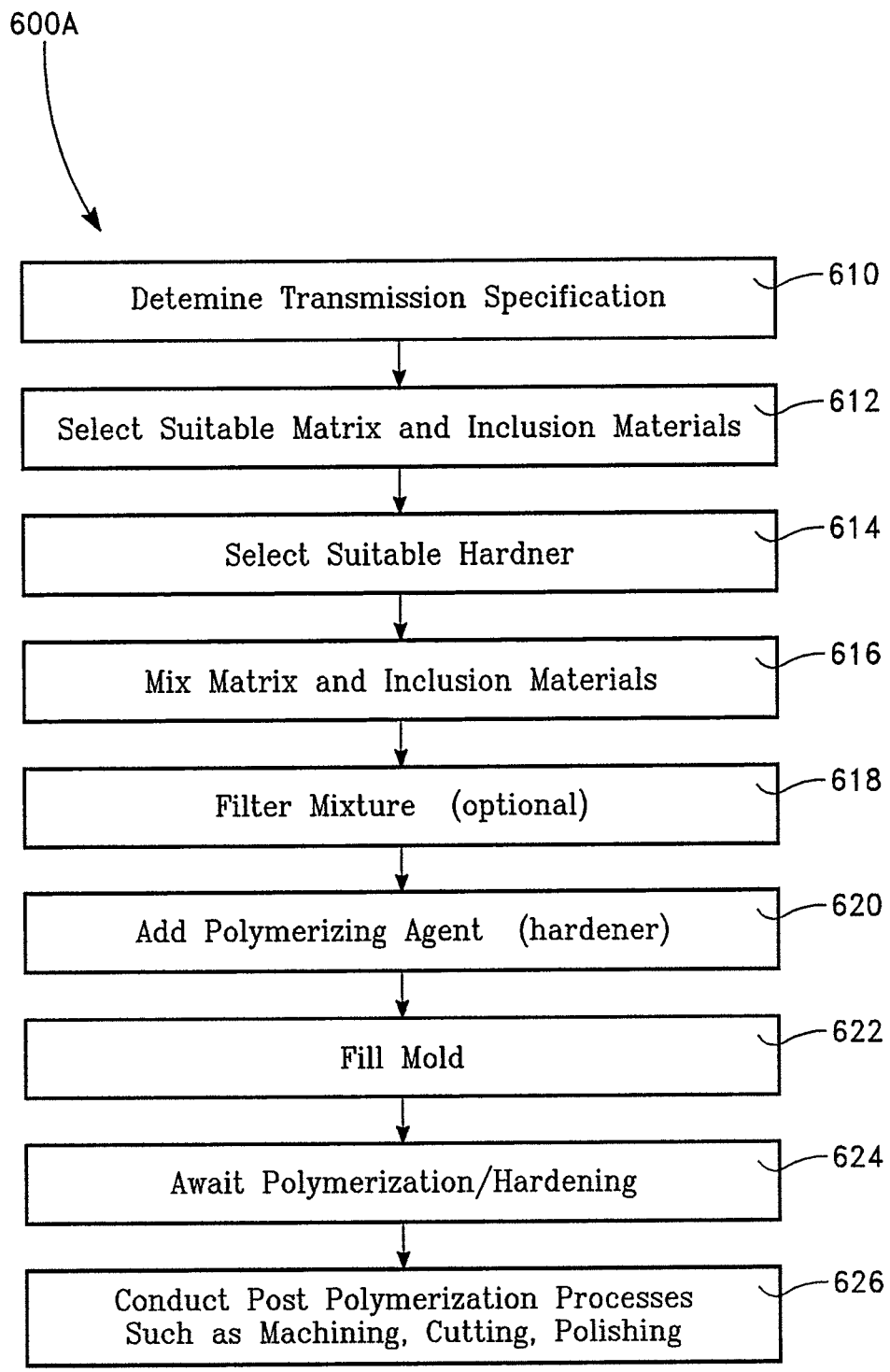
FIG. 6A shows a procedure for making a solid embodiment of the optical monolith of FIG. 2.
Figure 6B:
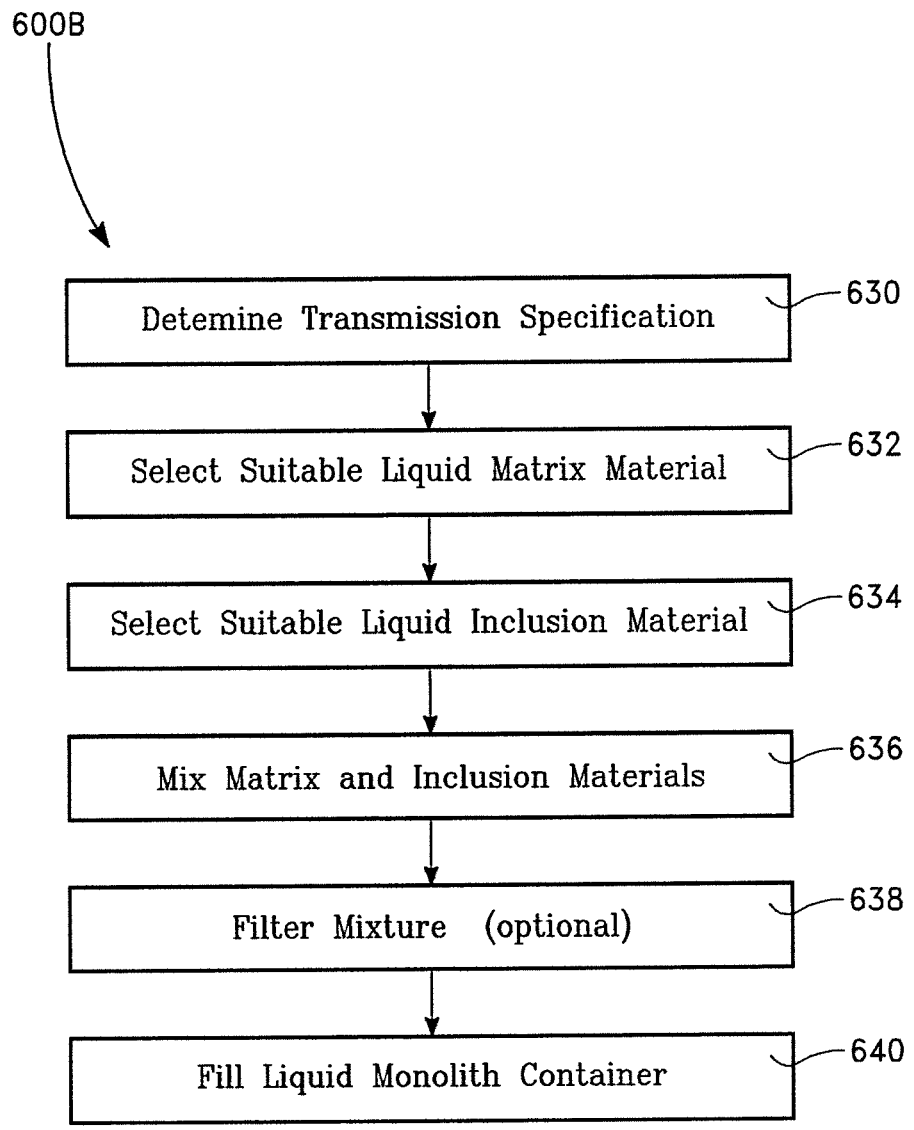
FIG. 6B shows a procedure for making a fluid embodiment of the optical monolith of FIG. 2.

FIGS. 6A and 6B show exemplary procedures for making optical monoliths 600A, 600B. In particular, FIG. 6A describes a procedure for making a solid optical monolith while FIG. 6B describes a procedure for making a liquid optical monolith.

Figure 4:
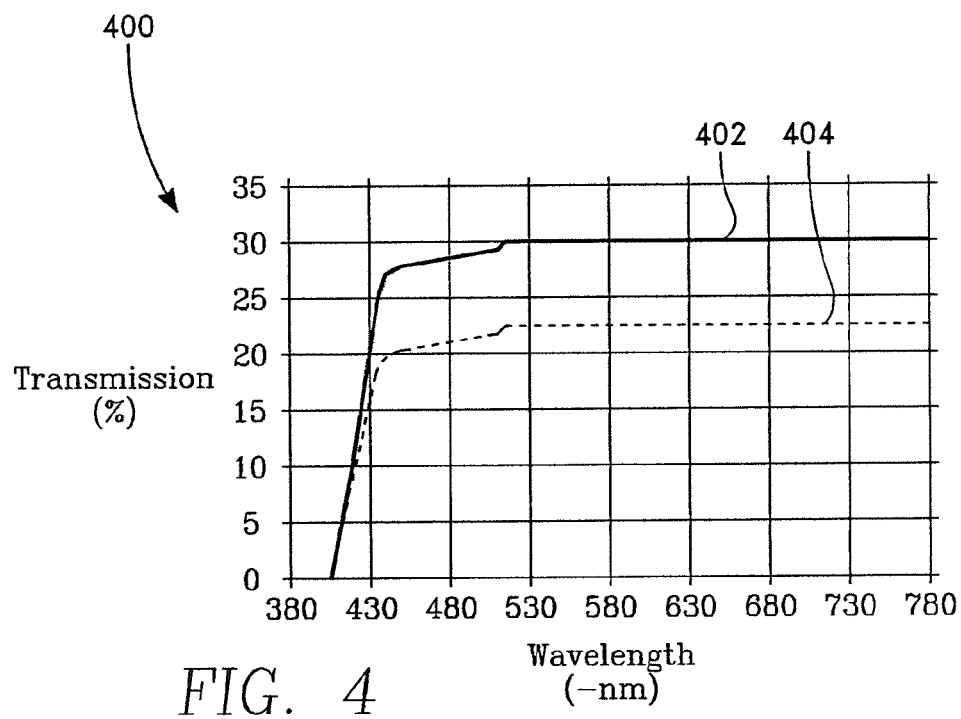
FIG. 4 shows a transmissivity specification of the optical monolith of FIG. 2.

As shown in FIG. 6A, making a solid optical monolith includes determining a transmission specification 610 such as the one shown in FIG. 4 above. Based on the transmission specification, suitable matrix and inclusion materials are selected 612. And, based on the matrix material, a suitable hardener is selected 614.

The selected matrix and inclusion materials are mixed 616 to form a homogeneous mixture. In some embodiments this mixture is filtered 618 to aid in mixing and/or control inclusion particle size. In an embodiment, the mixture is filtered to control inclusion particle size. For example, in an embodiment a 2 micron filter with a suitable high efficiency (97%) polypropylene filter bag is used.

A polymerizing agent/hardener is added to the homogenized mixture 620 which is used to fill an optical monolith mold 622 such as a mold for casting lens. The monolith is allowed to harden 624 in the mold until it can be safely removed from the mold. When the monolith is sufficiently hardened (either before or after removal from the mold), it is machined, cut and/or polished as needed for a particular application 626.

As shown in FIG. 6B, making a fluid optical monolith includes determining a transmission specification 630 such as the one shown in FIG. 4 above. Based on the transmission specification, suitable liquid matrix and liquid inclusion materials are selected 632, 634. The selected matrix and inclusion materials are mixed 636 to form a homogeneous solution. In some embodiments this solution is filtered 638, for example to aid in mixing. In an embodiment a 2 micron filter with a suitable high efficiency (97%) polypropylene filter bag is used. The prepared fluid optical monolith is now ready for packaging and a transparent or translucent pliable container is filled with the mixture 640.

Uses of optical monoliths include optical display geometries with insufficient separation between the light source and the display surface to provide acceptable light dispersion. The optical displays may be simple displays such as the display of FIG. 2. The optical displays may also be a subsystem in more complex devices such as complex displays and switching devices. Among others uses, optical displays with an optical monolith are useful in single-zone displays, multi-zone displays and switches such as pushbutton switches incorporating one or more of single-zone and multi-zone displays.

Figure 7:
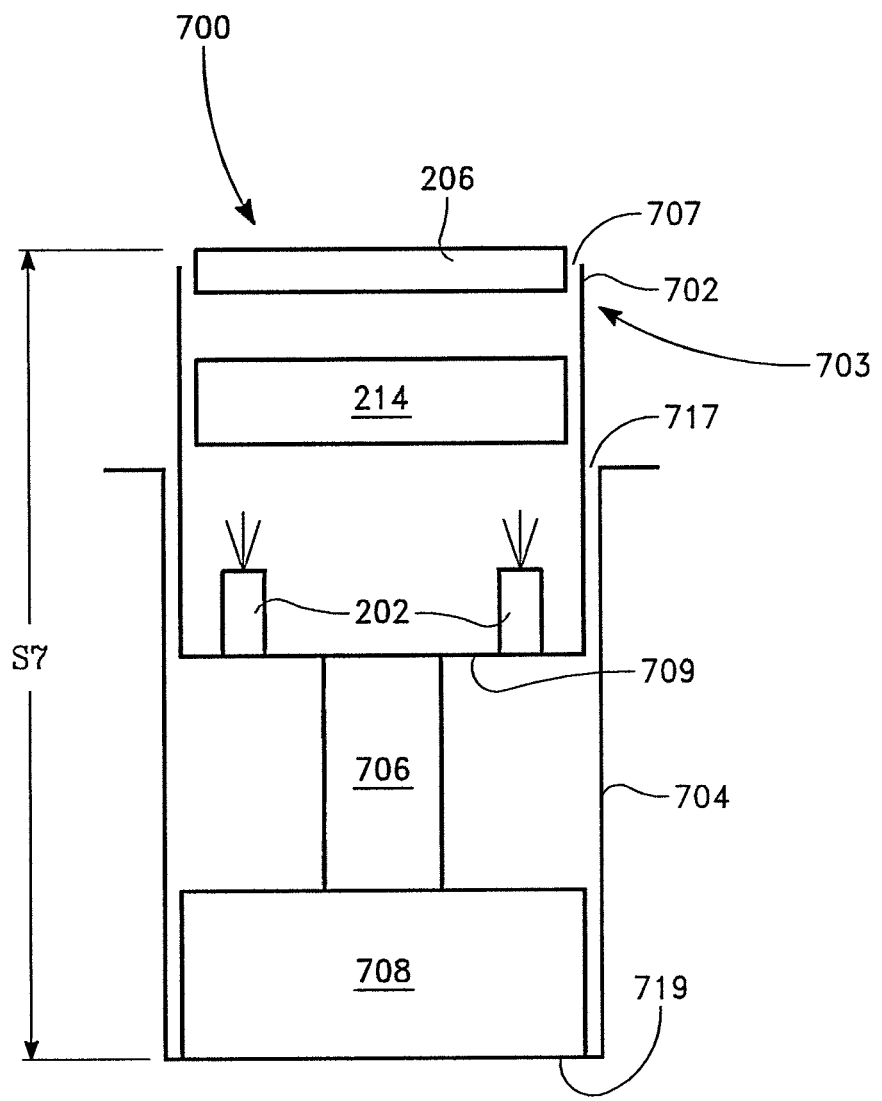
FIG. 7 shows a pushbutton switch incorporating the optical monolith of FIG. 2.

FIG. 7 shows a pushbutton switch with an optical display incorporating an optical monolith of the present invention 700. The pushbutton switch includes an electro-mechanical switch mechanism 708, an optical display capsule 703, and a push rod 706 for transmitting forces exerted on the display capsule to the switch mechanism.

The optical display capsule 703 includes a capsule housing 702 having a substantially open end 707 and a substantially closed end 709. The open end supports an indicia layer 206 and the closed end supports one or more light sources such as light emitting diodes. An optical monolith 214 is located between the light sources and the indicia layer.

The pushbutton switch 700 includes a switch housing 704 having a substantially open end 717 and a substantially closed end 719. The optical display capsule 703 protrudes from the switch housing open end and an electro-mechanical switch 708 is supported by the switch housing closed end. As persons of ordinary skill in the art will appreciate, the overall switch length S7 varies with operation of the pushbutton.

In an embodiment, a push rod 706 is fixed at one end to the optical display capsule 703 and at the other end to an electromechanical switch 708. Switch operation occurs when the optical display capsule moves relative to the electro-mechanical switch such as when an operator presses the optical display capsule pushbutton and transfers forces to the electro-mechanical switch via the push rod 706.

While various embodiments of the present invention have been described above, it should be understood that they have been presented by way of example only, and not limitation. It will be understood by those skilled in the art that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. An optical device for enhancing light diffusion comprising:
  a monolith including an optical plastic;
  the monolith operable to transmit light incident on one monolith surface to and through a second monolith surface, a monolith thickness being defined by a spacing between the first and second monolith surfaces;
  polymeric inclusions distributed throughout the optical plastic for interrupting light rays refracted by the monolith;

the polymeric inclusions selected to simultaneously a) absorb a particular portion of incident light and b) diffuse refracted rays of the incident light;

wherein the optical plastic, inclusions and thickness are chosen to provide a light transmissivity from about 22.5 percent to about 30 percent over a range of wavelengths from about 430 nanometers to at least about 780 nanometers;

wherein the optical plastic and inclusions are liquids;

wherein a homogenous solution of the optical plastic and inclusion liquids is enclosed in a pliable, transparent container;

further including:

one or more collimated light sources and an indicia layer;

wherein the pliable transparent container is located between the light sources and the indicia layer; and, the pliable, transparent container is operable to deform and seal against an adjacent part.

2. The device of claim 1 further including:

an optical display capsule including an optical display capsule housing;

the optical display capsule housing having a substantially open end and a substantially closed end;

the indicia layer supported by the optical display capsule housing open end and the one or more collimated light sources supported by the optical display capsule housing closed end;

the pliable, transparent container operable to deform and seal against an adjacent part;

a switch housing having a substantially open end and a substantially closed end;

the optical display capsule protruding from the switch housing open end and an electromechanical switch supported by the switch housing closed end;

a push rod fixed at one end to the optical display capsule and at the other end to the electromechanical switch; and, the switch operable in response to relative motion between the optical display capsule and the switch housing.

* * * * *